United States Patent
Campanini (10) Patent No.: US 11,366,975 B2
(45) Date of Patent: Jun. 21, 2022

(54) APPARATUS FOR INSPECTING DOCUMENTS

(71) Applicant: Custom S.p.A., Fontevivo (IT)

(72) Inventor: Alberto Campanini, Fidenza (IT)

(73) Assignee: Custom S.p.A., Fontevivo (IT)

( * ) Notice: Subject to any disclaimer, the term of this patent is extended or adjusted under 35 U.S.C. 154(b) by 0 days.

(21) Appl. No.: 17/254,408

(22) PCT Filed: Jun. 14, 2019

(86) PCT No.: PCT/IB2019/054979
§ 371 (c)(1),
(2) Date: Dec. 21, 2020

(87) PCT Pub. No.: WO2019/243972
PCT Pub. Date: Dec. 26, 2019

(65) Prior Publication Data
US 2021/0133404 A1 May 6, 2021

(30) Foreign Application Priority Data

Jun. 21, 2018 (IT) .................... IT102018000006549
Jun. 21, 2018 (IT) .................... IT202018000002832

(51) Int. Cl.
*G06K 7/10* (2006.01)
*G06K 7/14* (2006.01)

(52) U.S. Cl.
CPC ....... *G06K 7/10366* (2013.01); *G06K 7/1413* (2013.01); *G06K 7/1417* (2013.01)

(58) Field of Classification Search
CPC . G06K 7/10366; G06K 7/1417; G06K 7/1413
See application file for complete search history.

(56) References Cited

U.S. PATENT DOCUMENTS

| 7,591,415 | B2 | 9/2009 | Jesme |
| 8,493,630 | B2 | 7/2013 | Queenan et al. |
| 2003/0163696 | A1 | 8/2003 | Rancien |
| 2006/0255140 | A1* | 11/2006 | Jusas ........................ G06K 5/02 235/451 |

(Continued)

FOREIGN PATENT DOCUMENTS

| DE | 102013222273 A1 | 5/2015 |
| FR | 2926150 A1 | 7/2009 |
| FR | 2968788 A1 | 6/2012 |

OTHER PUBLICATIONS

International Seacrh Report and Written Opinion of the International Searching Authority; Application No. PCT/IB2019/054979; Completed: Sep. 2, 2019; dated Sep. 12, 2019; 13 Pages.

*Primary Examiner* — Matthew Mikels
(74) *Attorney, Agent, or Firm* — Whitmyer IP Group LLC (57) ABSTRACT

An apparatus (1) for inspecting an identity document (D) is disclosed, wherein the identity document, which includes an RFID tag and a printed code, is positioned on the apparatus in a reading area (3) where a linear image sensor, which is movable by a motor-driven command, performs a scan to read the code of the document, and in which an RFID device communicates with the RFID tag, authentication of the identity document being performed by comparing the information supplied by the linear image sensor and the information supplied by the RFID device.

20 Claims, 6 Drawing Sheets

(56) References Cited

U.S. PATENT DOCUMENTS

2006/0287759 A1\* 12/2006 Charych ............... B66F 9/0755
  700/213
2012/0075442 A1  3/2012 Vujic \* cited by examiner

APPARATUS FOR INSPECTING DOCUMENTS

BACKGROUND OF THE INVENTION

The invention relates to an apparatus for inspecting documents, in particular an apparatus of portable type that enables effective inspections to be conducted whilst mobile, i.e. far from booths or other equipped workstations.

Specifically, but not exclusively, the invention can be applied to the inspection of an identity document, like an identity card or passport.

The prior art comprises various examples of apparatuses for inspecting passports or other types of identity document.

Patent publication US 2012/075442 A1 shows an apparatus according to the preamble of claim 1.

Patent publication DE 10 2013 222273 A1 shows a reading apparatus comprising a scanner for reading an image of a document, an antenna for communicating with an RFID transponder integrated in the document, a carriage which carries the scanner and the antenna together, driving means for moving the carriage and driving means for moving the antenna with respect to the scanner.

Patent publication U.S. Pat. No. 7,591,415 B2 shows a passport reader that includes an RFID interrogation source for interrogating and obtaining information from an RFID element associated with a passport, and an antenna for transmitting signals between an RFID element and the RFID interrogation source.

Patent publication U.S. Pat. No. 8,493,630 B2 shows a passport and identity card reader that minimizes the time and effort necessary for reading/scanning, enabling an operator to slide a passport with one hand whilst performing other security tasks with the other hand.

Patent publication US 2003/0163696 A1 shows a reader of an identity document, in which the document has at least one transponder and a code and in which the reader comprises: a radio frequency device that, during an identity check, reads and possibly programs the transponder; at least one code reader adapted to the type of code used by the document; scanning means for scanning the code; a decoder for processing scanned data; and data management means for comparing the information supplied by the radio frequency device with the information supplied by the code reader for authenticating the identity document and/or verifying that the holder of the document is actually the authorized holder of the identity document.

Using prior art apparatuses for inspecting identity documents, however, the operations that are necessary for performing the inspection can be long and laborious, with the consequent risk of causing the formation of long queues for persons subjected to identity checks, and the risk of decreasing the degree of security and reliability of the inspection.

There is thus the need to permit an inspection of the documents rapidly and simply and to improve the reliability of the identity checks.

It is further desirable to devise an apparatus of portable type for inspecting identity documents, so that a person assigned to the identity check can perform random checks whilst mobile without the need to use a traditional manned kiosk station which is provided with a network connection and connection to the electric power supply.

It is further desirable to improve the ease of handling and use of known apparatuses for inspecting identity documents.

SUMMARY OF THE INVENTION

One object of the invention is to make available an apparatus that is suitable for inspecting documents and is able to overcome one or more of the prior art limits and drawbacks mentioned above.

One object of the invention is to devise an apparatus of portable type that enables a security operator to perform inspections whilst mobile and without the need to be at an equipped station.

One object of the invention is to provide an apparatus that is able to simplify the operations of authentication of the identity documents.

One advantage is to make available an apparatus for inspecting and/or authenticating an identity document that can be used easily and practically by an operator.

One advantage is to permit a person assigned to security checks to handle the apparatus using one hand only, leaving the other hand free and available for other activities linked to security.

One advantage is to enable a document to be inspected without the need to perform a reading scan by moving the document.

Such objects and advantages and still others are achieved by an inspection apparatus according to one or more of the claims set out below.

In one embodiment, an inspection apparatus comprises a reading area where an identity document can be positioned, a movable linear image sensor to read by scanning a code on the document, motor means for running the scanning movement of the linear image sensor, an RFID device configured to communicate with an RFID tag on the document, and data control and management means configured to compare the information supplied by the linear image sensor with the information supplied by the RFID device, so as to authenticate the identity document on the basis of the result of the comparison.

BRIEF DESCRIPTION OF THE DRAWINGS

The invention can be better understood and implemented with reference to the enclosed drawings that illustrate some embodiments thereof by way of non-limiting example, in which.

DETAILED DESCRIPTION

In the aforesaid figures, identical elements of various embodiments have been indicated, for the sake of simplicity, by the same numbering.

With reference to the aforesaid figures, overall with 1 an inspection apparatus for inspecting a document D has been indicated, in particular for inspecting and/or authenticating an identity document, like an identity card or passport.

The document D may include, in particular, an RFID tag and/or a code.

Documents are known that can include an RFID tag, or transponder, consisting of an electronic device that may comprise, in particular, an integrated circuit (chip) an RF antenna. The RFID tag may be, in particular, of the read-only type, read/write type, or of yet another type. The chip may contain information on the holder of the document and/or the history of the use of the document.

Documents are further known that can include a security code, for example a preprinted code, reading of which is necessary for enabling communication with the RFID tag. In particular, communication with the RFID tag may occur upon authorization in response to reading of the security code. The code may comprise a code like those usually used in electronic passports of known type, for example a code defined by a standardized algorithm.

The inspection apparatus 1 may comprise, in particular, a casing 2 (for example box-shaped) so shaped and sized as to be portable with a single hand of an operator (assigned to security checks).

Figure 1:
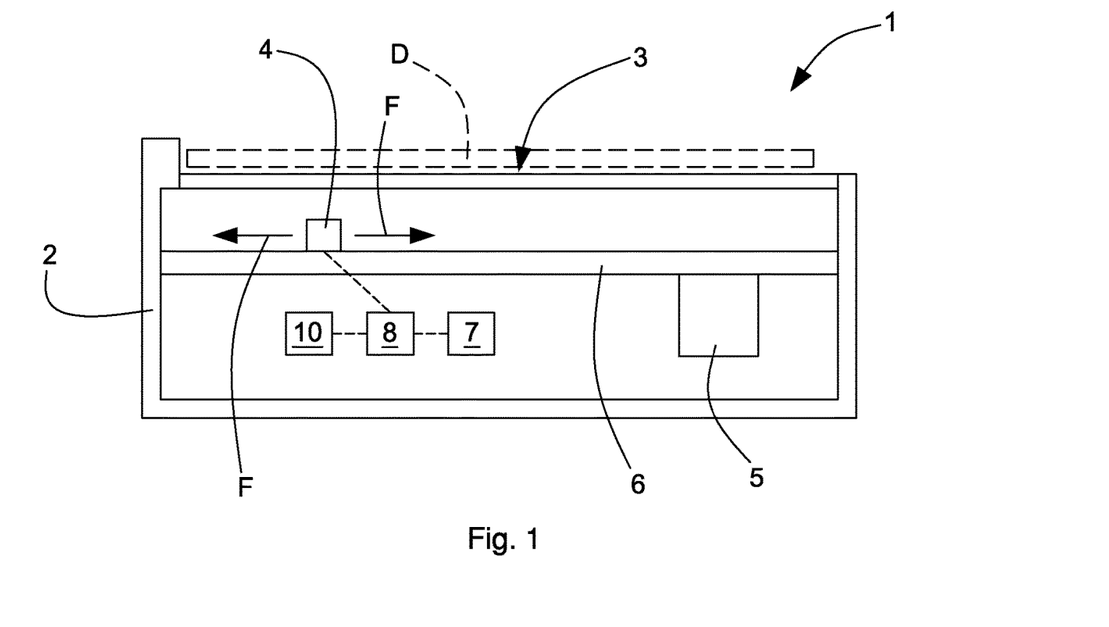
FIG. 1 is a diagram of a first embodiment of an inspection apparatus according to the present invention.
Figure 2:
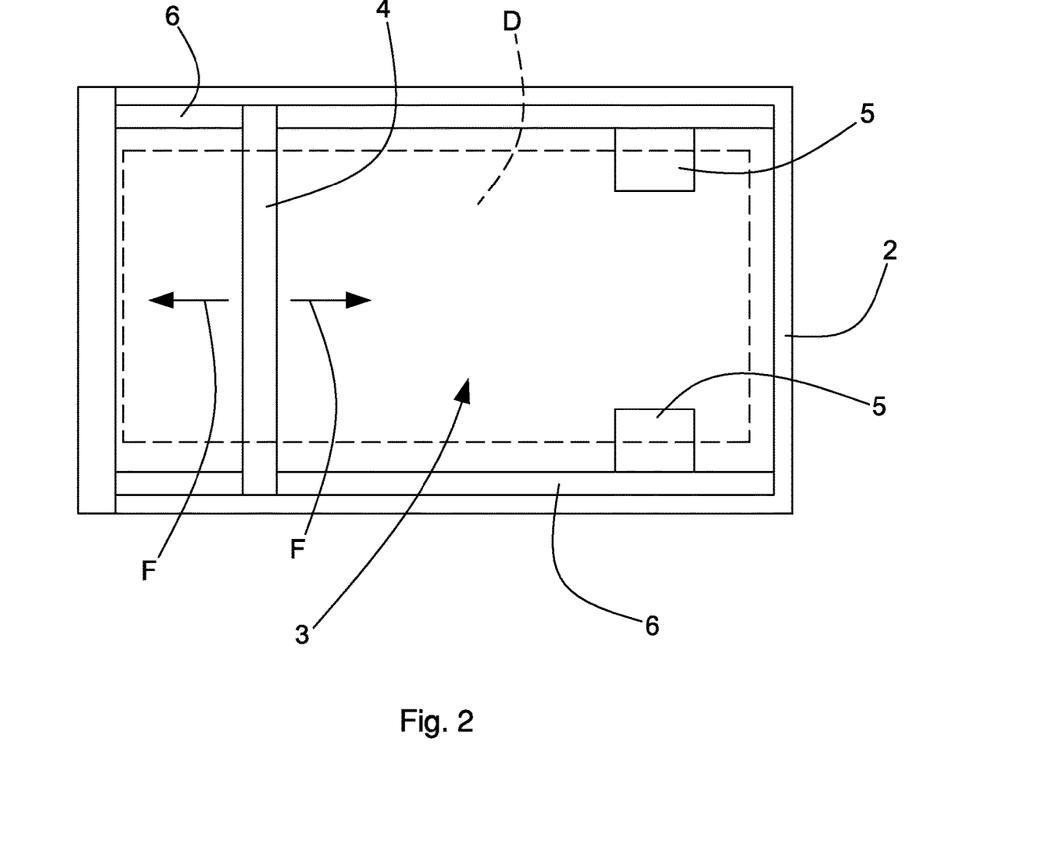
FIG. 2 is a plan view of the apparatus of FIG. 1.
Figure 3:
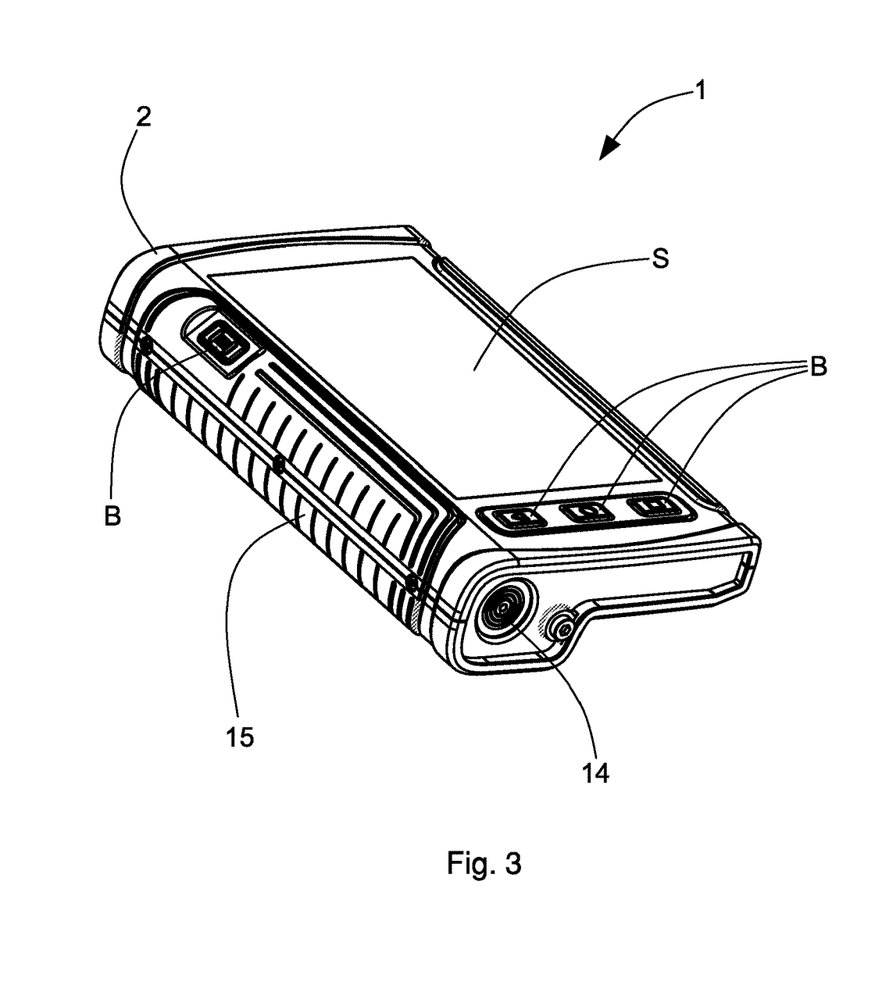
FIG. 3 is a perspective view of a second embodiment of an inspection apparatus according to the present invention.
Figure 4:
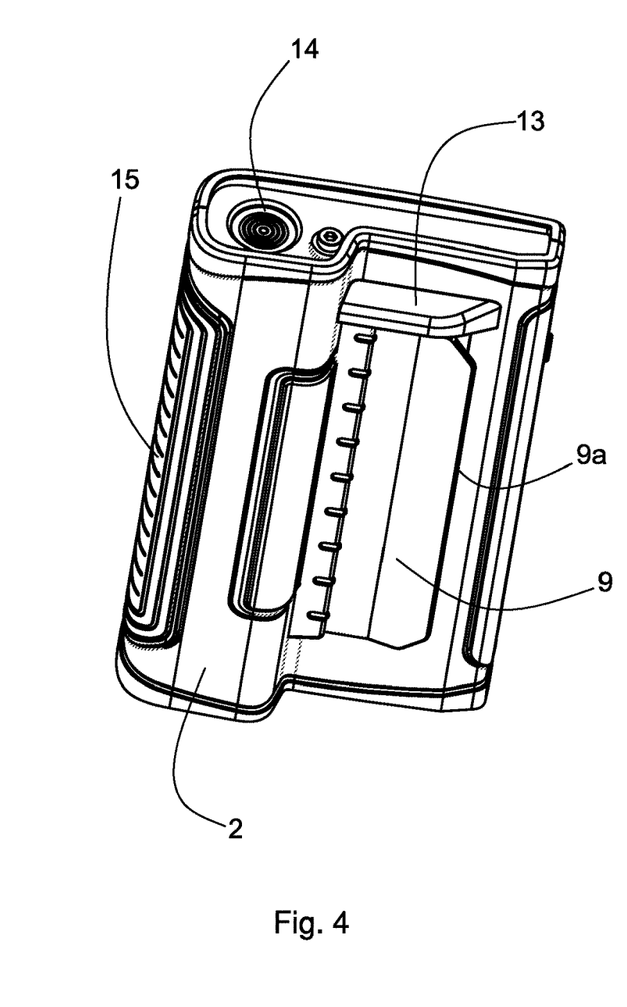
FIG. 4 is a view of the apparatus of FIG. 3 in another perspective.
Figure 5:
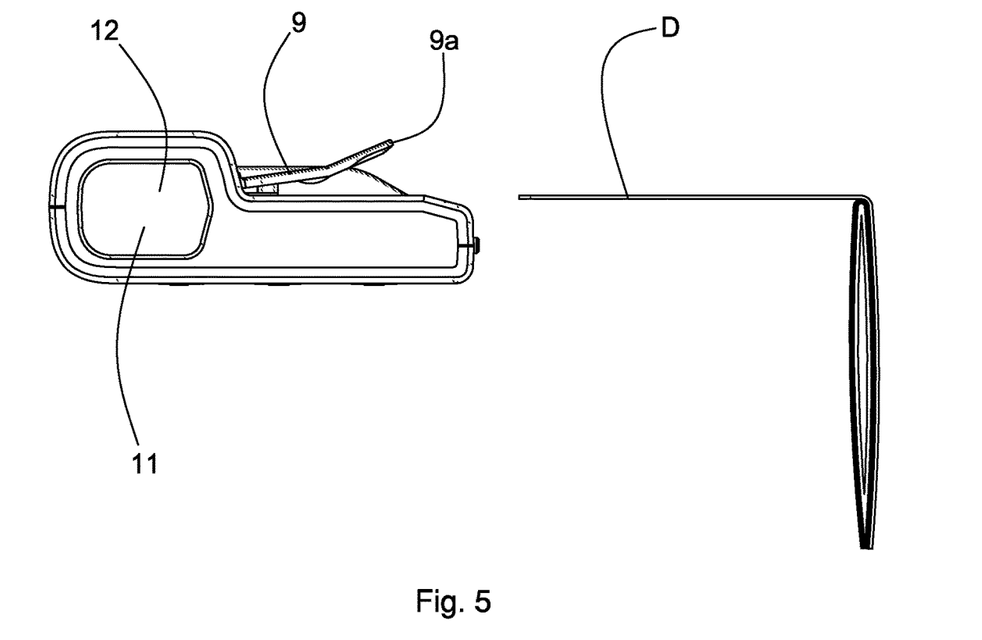
FIG. 5 is a lateral view of the apparatus of FIG. 3 in a configuration for inserting a document to be inspected.
Figure 6:
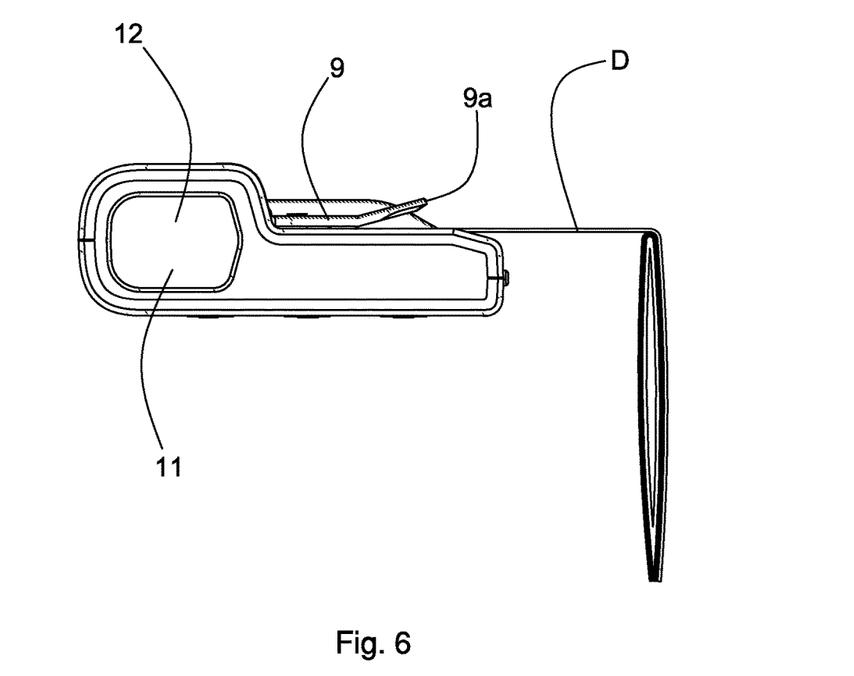
FIG. 6 is the view of FIG. 5 with the apparatus in a configuration for retaining the document during the inspection.
Figure 7:
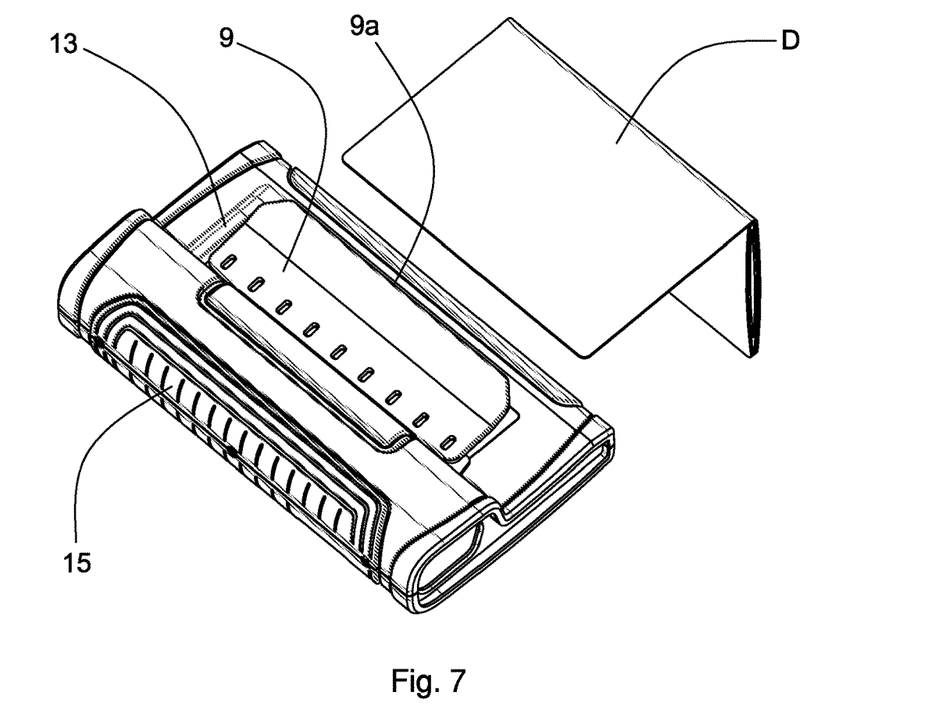
FIG. 7 is a perspective view of the inspection apparatus in the document inserting configuration as in FIG. 5.
Figure 8:
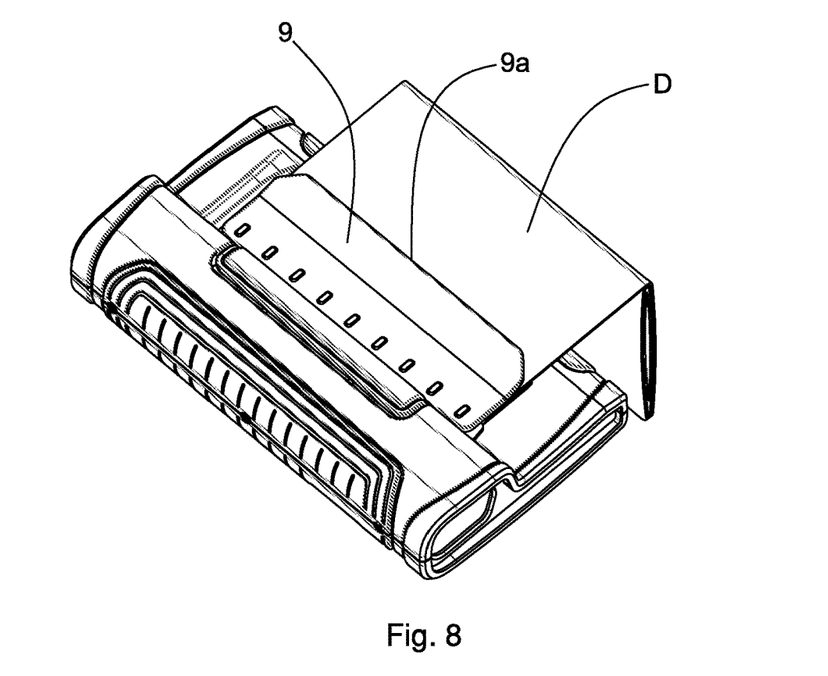
FIG. 8 the view of FIG. 7 with the inspection apparatus in the document retaining configuration as in FIG. 6.
Figure 9:
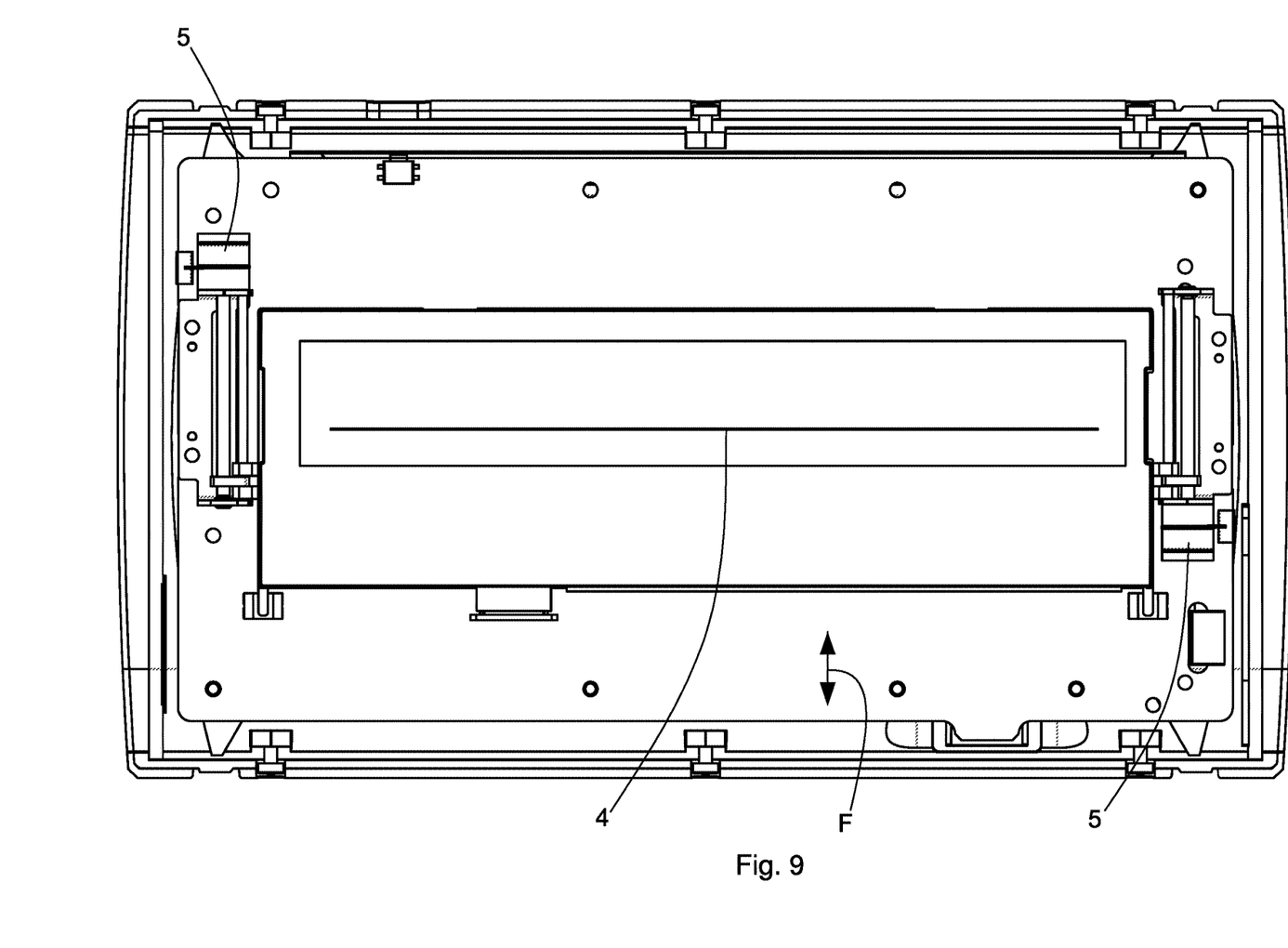
FIG. 9 is a top plan view of the apparatus of FIG. 3 with some parts removed to show others clearly.
Figure 10:
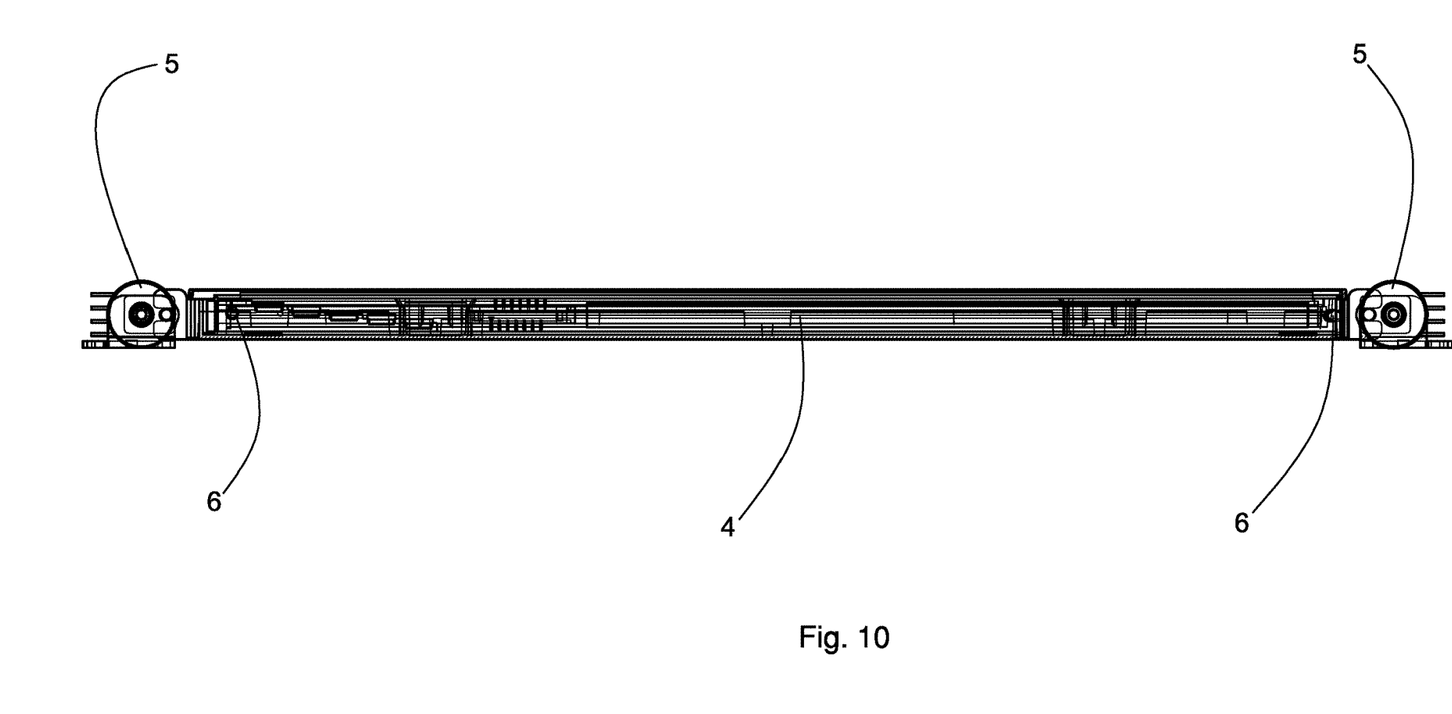
FIG. 10 is a bottom partial lateral view of FIG. 9.

The inspection apparatus 1 may comprise, in particular, a reading area 3 in which the document D can be positioned to enable reading of the code. The reading area 3 may be defined, for example, by a transparent wall of the casing 2. The wall may define, in particular, a flat surface to permit resting of a face of the document D. The reading area 3 may comprise, in particular, a window set up for permitting positioning of the document D, or a slit into which the document D can be inserted. In the specific case of FIGS. 3 to 10, the reading area 3 comprises a locking member with an arm or lever for retaining the document D against a (transparent) wall of the casing by an elastic force, as will be explained better below further on in the description.

The inspection apparatus 1 may comprise, in particular, scanning means 4 to read the code of the document D positioned in the reading area 3.

The scanning means 4 may comprise, in particular, at least one linear image sensor that is movable in the reading area 3 in one movement direction F (in particular a rectilinear direction) in both directions, with the possibility of performing a reading scan of the code. The linear image sensor may comprise, in particular, a sensor of CCD type or of CMOS type.

The inspection apparatus 1 may comprise, in particular, a special lighting device (not shown) which is suitable for permitting reading of a possible printed code by special (ultraviolet or infrared) inks.

The scanning means 4 may comprise, in particular, motor means 5 for moving the linear image sensor along the reading area 3.

The motor means 5 may be configured for moving the linear image sensor in the movement direction F transverse to a longitudinal extent of the linear sensor.

The motor means 5 may comprise, in particular, at least two motors that are distinct from one another and arranged on two opposite sides of the scanning means 4. The two motors are drivable independently of one another. Each of the two motors may be configured, in particular, for operating on a respective end of the linear image sensor (as in these embodiments). The motor means 5 may comprise, as in the embodiment of FIGS. 3 to 10, two linear motors.

The inspection apparatus 1 may comprise, in particular, guide means 6 with which the linear image sensor is slidingly coupled.

The guide means 6 may comprise, in particular, at least two sliding guides that are distinct and parallel to one another, each of which is coupled with a respective end of the linear image sensor (as in these embodiments).

The linear image sensor may be connected to the motor means 5 by a motion transmission mechanism, for example a transmission mechanism of the type with rack and pinion coupling and/or with belt and pulley coupling and/or with chain and sprocket coupling and/or with a connecting rod and crank coupling and/or with a screw and nut screw coupling, etc.

The inspection apparatus 1 may comprise, in particular, a first RFID device 7 for communicating with the RFID tag on the document D. The RFID device 7 may be able to interrogate (by an RF antenna) the RFID tag to read the information contained therein. The RFID device 7 may be able to write information on the RFID tag, for example to update the information contained in the RFID tag. The RFID device 7 is usable during an identity check for reading and possibly programming the RFID tag.

The inspection apparatus 1 may comprise, in particular, (programmable) electronic control means 8. This control means 8 may be configured, in particular, for managing data coming from the scanning means 4 and from the first RFID device 7. The electronic control means 8 may be configured for controlling the overall operation of the inspection apparatus 1.

The electronic control means 8 may comprise, in particular, an electronic card with a microprocessor. The electronic card may be contained and/or supported by the casing 2. The electronic control means 8 may be programmable and comprise, in particular, computer programme instructions.

This control means 8 may comprise, in particular, a decoder for processing data scanned by the scanning means 4.

This control means 8 may comprise, in particular, means for comparing the information supplied by the scanning means 4 with the information supplied by the first RFID device 7. This means for comparing enables it to be checked that the information obtainable from the data recorded in the RFID tag incorporated into the document D is identical, or at least concordant, with the information resulting from the data that are detectable from reading the (printed) code on the document D.

The casing 2 of the apparatus may be configured, as in these embodiments, for containing and supporting the scanning means 4 and/or the first RFID device 7 and/or the means for comparing the information and/or the control means 8 of the apparatus.

The inspection apparatus 1 may comprise, in particular, a (for example graphic) user interface connected to the electronic control means 8. The user interface may comprise, for example, a display S that may be so configured as to display at least one result of a comparison made by the aforesaid means for comparing. The display S may be arranged, for example, on one apparatus 1 side opposite a side that has the reading area 3 of the document. The user interface may comprise, in particular, a touchscreen. The user interface may comprise, in particular, one or more physical keys 8 (in replacement of or in addition to a touchscreen), such as, for example a push-button activating the scanning means 4 and/or an ON-OFF push-button.

The inspection apparatus 1 may comprise, in particular, locking means 9 configured for locking the document D in position in the reading area 3. The locking means may comprise, as in the embodiment of FIGS. 3 to 10, at least one locking member (arm, or jaw, or lever). The locking member may include, as in this embodiment, a first free end 9*a* and a second end (opposite the first end 9*a*) constrained on the casing 2 of the apparatus 1. The first free end 9*a* may define, in particular, an opening for inserting and extracting at least one portion of the document D (for example, at least the portion of document D that contains the code). The second end may include a hinge zone around which the locking member can rotate. The locking member may be movable with the possibility of assuming a closed locking position (FIGS. 6 and 8), in which it retains the document D (against the casing 2 of the apparatus 1), and an open insertion position (FIGS. 5 and 7), in which the document D can be inserted and extracted through the first free end 9*a*. The first free end 9*a* of the locking member may comprise, in particular, a portion that is tilted and/or folded upwards to favour the introduction of the document D and to favour, further, the insertion of the fingers of a hand of the operator for lifting the locking member.

It is possible, as in this embodiment, to arrange elastic means that is suitable for exerting on the locking member an elastic force that pushes the locking member to the closed position. The elastic means may comprise, in particular, a spring (for example a torsion and/or flexure spring) operating in the hinge zone of the second end of the locking member.

In use, an operator can grip the apparatus with one hand and lift the locking means 9 (locking arm or lever) with the same hand, can then insert the document D with the other hand under the locking means 9 and then release the locking means 9 that will then grip and lock the document D by virtue of the retaining force exerted by the elastic means. It is thus possible to hold the apparatus 1 easily with just one hand and simultaneously retain the document D in the inspection position, preventing the document D from falling during scanning.

The (programmable) electronic control means 8 may be configured, in particular, to display automatically on the display S the presence of an irregularity relating to the authentication and/or the concordance between the information supplied by the scanning means 4 of the code and the information supplied by the first RFID device 7.

The inspection apparatus 1 may comprise, in particular, means (not shown) for acoustic and/or luminous and/or mechanical (for example by vibration) signalling to indicate automatically the presence of an irregularity identified by the aforesaid comparison of data.

The inspection apparatus 1 may comprise, in particular, a second RFID device 10 configured for communicating with a second RFID tag. The second RFID tag may comprise, in particular, a tag associated with (a label applied to) an object that is distinct and separated from the identity document D, for example a bag carried by the person in possession of the document D that is the object of the inspection.

The second RFID device 10 may be configured, in particular, for operating a frequency band that is different from that of the first RFID device 7.

The first RFID device 7 may be, in particular, connected to the second RFID device 10 (for example by the control means 8) so as to be able to add to the RFID tag incorporated with the identity document D the information supplied by the second RFID device 10 (information recorded in the RFID tag incorporated into the object carried by the person in possession of the ID document D).

The inspection apparatus 1 may comprise, in particular, a camera 11 that may be used, for example, to detect in real time an image of the face of the person in possession of the document D that is the object of the inspection. The inspection apparatus 1 may comprise, in particular, facial recognition means connected to the camera 11. The facial recognition means may comprise, in particular, digital image processing software. This facial recognition means is configured, in particular, to compare the information supplied by the facial recognition means with the information supplied by the first RFID device 7, so as to identify or check the identity of a person, starting with one or more images portraying the person that are obtained by the camera, compared with given identification present on the RFID tag of the identity document D.

The inspection apparatus 1 may comprise, in particular, a localization device (not shown), which in the specific case can include a GPS terminal configured to supply information on positioning (geographical coordinates) of the apparatus 1 by the reception of radio signals and the processing of these signals. The localization device may further be able to provide information on the data and/or on the timetable.

The first RFID device 7 may be, in particular, connected to the localization device and configured so as to add to the RFID tag incorporated into the identity document D the information supplied by the localization device (geographical coordinates and/or inspection timetable).

The inspection apparatus 1 may comprise, in particular, a first data transfer device (not shown), for example of the type used in mobile telephony for connection to the Internet network. The first data transfer device may comprise, for example, a GSM, or GPRS, or UMTS system.

The inspection apparatus 1 may comprise, in particular, a second data transfer device, for example of the type used in mobile telephony for short-range connection with other devices (for example by a radio signal within a range of a few metres or a few dozen metres). The second data transfer device may comprise, for example, a Bluetooth system.

The inspection apparatus 1 may comprise, in particular, reading means 12, in particular for reading codes, such as for example a barcode reader (1D and/or 2D). The reading means 12 may be arranged, as in the embodiment of FIGS. 3 to 10, in a front zone of the casing 2 of the apparatus 1. The reading means 12 is configured so as to enable a ticket to be read (for example an entry ticket or a plane ticket or another journey ticket or other chit/receipt for booking/purchasing a seat for a show, a parking place or other service or event). The reading means 12 in particular permits a ticket (journey ticket, entry coupon, etc) to be read and the electronic control means 8 to be provided with the information contained on the ticket to carry out cross checks, for example a cross check between the data contained in the ticket and the information contained in the document D inspected by the scanning means 4 and/or the first RFID device 7 and/or a cross check between the data contained in the ticket and the information obtainable from the second RFID device 10.

The inspection apparatus 1 may comprise, as in the embodiment of FIGS. 3 to 10, abutting means 13 for facilitating positioning of the document D in the reading area 3. The abutting means 13 may comprise, in particular, a ridge that emerges from the casing 2. The abutting means 13 may be arranged, for example, on a perimeter side of the reading area 3. The abutting means 13 may extend in length in a direction that is transverse (orthogonal) to a direction of longitudinal extent of the first free end 9*a* and/or of the second fixed end of the locking means 9. The abutting means 13 may be so shaped and arranged that, in a desired scanning position of the document D in the reading area 3, one side of the document D (in particular a side that is contiguous with and perpendicular to a side that is inserted into the opening defined by the first end 9a of the locking means 9) abuts against the abutting means 13.

The inspection apparatus 1 may comprise, in particular, a wireless communication device (for example a device that is able to communicate with a WLAN network), such as for example a Wi-Fi device of the type used in mobile telephony for connection to a Wi-Fi network.

The inspection apparatus 1 may comprise, in particular, sensor means (not illustrated, for example optical measuring means that is suitable for lighting the skin of the individual and measuring the quantity of return light) to measure the heart rate of the person in possession of the inspected document D, so as to determine in real time a possible state of agitation of the person during the check.

The inspection apparatus 1 may comprise, in particular, a biometric recognition device (not shown, for example a fingerprint reader and/or an iris reader). The biometric recognition device may be, in particular, distinct and separated from the casing 2 of the apparatus 1. The biometric recognition device may be, in particular, connected to the apparatus 1 by a wireless connection, for example by the second data transfer device (Bluetooth connection), or by a connecting cable.

The biometric recognition device (fingerprint reader) may consist, substantially, of an accessory separated by the inspection apparatus 1 and also of portable type, like the inspection apparatus 1. In particular, the biometric recognition device may be placed back in a casing that the security operator can carry with himself or herself (for example attached to the belt).

The biometric recognition device may be separated from the inspection apparatus 1 as it might not always be required and also for reasons of greater security and hygiene, i.e. to prevent the inspection apparatus 1, which is normally gripped by a person assigned to security checks, being able to be touched by third parties. The biometric recognition device is nevertheless able to communicate with the inspection apparatus 1 to transfer data (for example by Bluetooth).

The inspection apparatus 1 may comprise, in particular, at least one connector 14 for connecting to at least one cable, for example a cable for recharging the apparatus 1 and/or for exchanging data with an external device.

With reference to the embodiment of FIGS. 3 to 10, with 15 a grip has been indicated that is arranged on one side of the casing 2. The grip 15 may comprise, as in this embodiment, one portion of casing that is enlarged with respect to the rest of the casing, so as to define, on one side (behind, opposite the side that has the display S) of the apparatus 1, a stair, or step, which forms a lowered zone in which the reading area 3 is situated where the document D to be scanned is introduced. The (front) opposite side of the apparatus 1, may have, as in this embodiment, a substantially flat surface in which the display S is situated. The grip 15 may comprise, in particular, a manual gripping surface of curved shape (for example made of slip-resistant material). The grip 15 may be arranged, in particular, on one side of the casing 2 opposite a side in which, during scanning, there is a part of the document D (not containing the code) that remains outside the reading area 3.

In use, an operator (for example a person assigned to the security check) takes the document D to be inspected and positions the document D in the reading area 3, maintaining the document D in position using just one hand, without moving the document D from the reading position. After this, the operator activates the inspection procedure (for example by pressing a control button of the user interface). The inspection procedure provides for the first RFID device 7 reading remotely the information stored in the RFID tag on the document D, whilst the scanning means 4 acquires an image of the readable data present on the document, in particular of the security code combined with the RFID tag.

As said, during scanning the document D is maintained stationary in the reading position, whilst the linear image sensor moves at the command of the motor means 5. This step may occur whilst the operator continues to maintain the inspection apparatus 1 gripped, together with the document D (immobile with respect to the apparatus 1), whilst the other hand is free to perform other tasks.

Acquiring the image of the code present on the document D accordingly comprises the step of handling the linear image sensor (by activating the motor means 5) to scan the entire document D or at least the part of the document that displays the code. After this, the control means 8 (in particular the decoder) decodes the data corresponding to the code.

The control means 8 then processes the data gathered by the scanning means 4 and by the first RFID device 7. In particular, the (decoded) data coming from the scanning means 4 of the code are compared with the data recorded in the RDIF tag (coming from the first RFID device 7) to check the correspondence between these data. If this comparison shows that the detected data do not agree with one another, a possible attempt to falsify the information is reported.

The first RFID device 7 also enables the RFID tag to be programmed. It is possible to store additional data in the RFID tag, for example data relating to the entry of a given person into a given territory on a given date. The additional data may be provided, for example, by making use of the localization device (GPS terminal) incorporated in the inspection apparatus 1.

The invention claimed is:

1. An apparatus for inspecting a document, wherein the document includes an RFID tag and a code, said apparatus comprising:
    a casing configured to be portable with one hand by an operator inspecting the document;
    a reading area on said casing in which the document can be positioned to allow a reading of the code;
    a lock configured to lock the document, said lock comprising at least one free end which defines at least one opening for insertion and extraction of at least a portion of the document;
    a scanner configured to read the code of the document positioned in said reading area;
    a first RFID device for communicating with the RFID tag;
    a comparator configured to compare information provided by said scanner with information provided by said first RFID device;
    wherein:
    said scanner comprises at least one linear image sensor movable in said reading area so as to perform a code reading scan;
    the apparatus comprises a motor configured to move said linear image sensor in a moving direction that is transverse to a longitudinal extension of said linear image sensor;
    said motor comprises at least two motors which are distinct from each other and are operable independently of each other; and
    each of said motors is configured to operate on a respective end of said linear image sensor.

2. The apparatus according to claim 1, wherein said reading area is defined by a transparent wall of said casing.

3. The apparatus according to claim 1, comprising a display connected to said comparator so as to display at least one result of a comparison operated by said comparator.

4. The apparatus according to claim 3, wherein said display is arranged on a side of the casing that is opposite a side which has said reading area.

5. The apparatus according to claim 1, wherein said lock is susceptible of assuming at least one open position for insertion in which the document can be inserted and extracted through said first end, and at least one closed position for locking in which the document is held in position in said reading area by said lock against said casing, said lock comprising elastic means arranged to exert an elastic force which urges the lock towards the closed position.

6. The apparatus according to claim 1, wherein said casing is configured to contain and support at least said scanner and said motor.

7. The apparatus according to claim 1, wherein said at least two motors are arranged on two opposite sides of said scanner.

8. The apparatus according to claim 1, wherein said at least two motors comprise two linear motors.

9. The apparatus according to claim 1, comprising a guide with at least two sliding guides each coupled to a respective end of said linear image sensor.

10. An apparatus for inspecting a document, wherein the document includes an RFID tag and a code, said apparatus comprising:
  a casing configured to be portable with one hand by an operator inspecting the document;
  a reading area on said casing in which the document can be positioned to allow a reading of the code;
  a scanner configured to read the code of the document positioned in said reading area;
  a first RFID device for communicating with the RFID tag;
  a comparator configured to compare information provided by said scanner with information provided by said first RFID device;
  a second RFID device configured to communicate with a second RFID tag, in particular a tag associated with a label applied to an object, for example a baggage, distinct and separated from the document;
  wherein:
  said scanner comprises at least one linear image sensor movable in said reading area so as to perform a code reading scan;
  the apparatus comprises a motor configured to move said linear image sensor in a moving direction that is transverse to a longitudinal extension of said linear image sensor;
  said motor comprises at least two motors which are distinct from each other and are operable independently of each other.

11. The apparatus according to claim 10, wherein said second RFID device is configured to operate in a different frequency band with respect to that of said first RFID device.

12. An apparatus for inspecting a document, wherein the document includes an RFID tag and a code, said apparatus comprising:
  a casing configured to be portable with one hand by an operator inspecting the document;
  a reading area on said casing in which the document can be positioned to allow a reading of the code;
  a scanner configured to read the code of the document positioned in said reading area;
  a first RFID device for communicating with the RFID tag;
  a comparator configured to compare information provided by said scanner with information provided by said first RFID device;
  a camera, facial recognition means connected to said camera and means for comparing information provided by said facial recognition means with information provided by said first RFID device;
  wherein:
  said scanner comprises at least one linear image sensor movable in said reading area so as to perform a code reading scan;
  the apparatus comprises a motor configured to move said linear image sensor in a moving direction that is transverse to a longitudinal extension of said linear image sensor;
  said motor comprises at least two motors which are distinct from each other and are operable independently of each other.

13. The apparatus according to claim 12, wherein said at least two motors are arranged on two opposite sides of said scanner.

14. The apparatus according to claim 12, wherein said at least two motors comprise two linear motors.

15. The apparatus according to claim 12, comprising a guide with at least two sliding guides each coupled to a respective end of said linear image sensor.

16. The apparatus according to claim 15, wherein said at least two sliding guides are distinct and parallel to each other.

17. The apparatus according to claim 12, comprising a lock configured to lock the document, said lock comprising at least one free end which defines at least one opening for insertion and extraction of at least a portion of the document.

18. The apparatus according to claim 17, wherein said lock is susceptible of assuming at least one open position for insertion in which the document can be inserted and extracted through said first end, and at least one closed position for locking in which the document is held in position in said reading area by said lock against said casing, said lock comprising elastic means arranged to exert an elastic force which urges the lock towards the closed position.

19. The apparatus according to claim 12, wherein said reading area is defined by a transparent wall of said casing.

20. The apparatus according to claim 12, comprising a display connected to said comparator so as to display at least one result of a comparison operated by said comparator.

* * * * *